United States Patent
Chang et al.

(10) Patent No.: US 10,503,284 B1
(45) Date of Patent: Dec. 10, 2019

(54) RETRACTABLE PEN

(71) Applicant: Acer Incorporated, New Taipei (TW)

(72) Inventors: Kai-Lin Chang, New Taipei (TW); Yan-Lin Kuo, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/137,533

(22) Filed: Sep. 20, 2018

(30) Foreign Application Priority Data

Jun. 29, 2018 (TW) .............................. 107122610 A

(51) Int. Cl.
  *G06F 3/0354* (2013.01)
  *G06F 1/16* (2006.01)

(52) U.S. Cl.
  CPC ........ *G06F 3/03545* (2013.01); *G06F 1/1656* (2013.01)

(58) Field of Classification Search
  CPC ........ B43K 23/08; B43K 23/12; B43K 29/08; G06F 3/03545; G06F 3/046; G06F 2200/1632; G06F 2203/041; G06F 2203/04106; G06F 2203/04108; G06F 3/0488; G06F 3/04883
  See application file for complete search history.

(56) References Cited

U.S. PATENT DOCUMENTS

| 9,884,510 B1 | 2/2018 | Foster |
| 2014/0253466 A1 | 9/2014 | Brewer |

FOREIGN PATENT DOCUMENTS

| TW | M418811 | 12/2011 |
| TW | M459446 | 8/2013 |
| TW | I515537 | 1/2016 |
| TW | I532595 | 5/2016 |
| TW | 201806788 | 3/2018 |
| TW | I616782 | 3/2018 |

*Primary Examiner* — Stacy Khoo
(74) *Attorney, Agent, or Firm* — JCIPRNET

(57) ABSTRACT

A retractable pen adapted for being accommodated in a portable electronic device is provided. The retractable pen includes a housing, a shaft fixed in the housing and having a first ratcheting structure, a cap having a second ratcheting structure movably engaged with the first ratcheting structure, a driving member rotatably sheathing the shaft and having a third ratcheting structure, and an elastic member sheathing the shaft and leaning against the shaft and the driving member. The elastic member constantly drives the driving member toward the first ratcheting structure or the second ratcheting structure. In a first state, the third ratcheting structure leans against the first ratcheting structure. In a second state, the third ratcheting structure is movably engaged with the second ratcheting structure and leans against the first ratcheting structure so as to push the cap away from the housing.

12 Claims, 9 Drawing Sheets

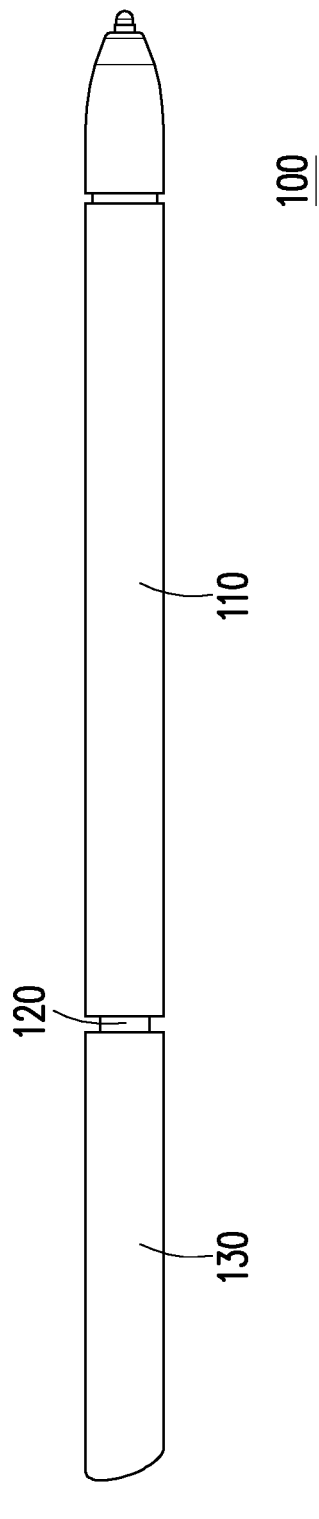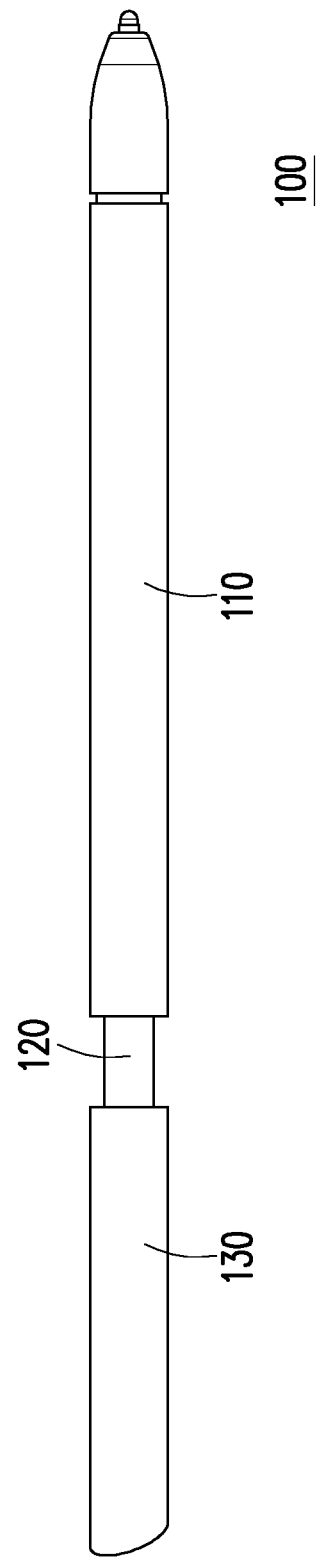
FIG. 1C
FIG. 1D

RETRACTABLE PEN

CROSS-REFERENCE TO RELATED APPLICATION

This application claims the priority benefit of Taiwan application serial no. 107122610, filed on Jun. 29, 2018. The entirety of the above-mentioned patent application is hereby incorporated by reference herein and made a part of this specification.

BACKGROUND OF THE INVENTION

Field of the Invention

The disclosure relates to a retractable pen, and particularly relates to a retractable pen adapted for being accommodated in a portable electronic device.

Description of Related Art

Currently, many portable electronic devices (such as tablet computers, smart phones, and laptop computers) all adopt touch display screens so that users may control the electronic products by directly inputting command on the display screens. In the existent touch display screen, the touch function is mostly performed by the user's finger or a stylus.

However, in order to facilitate the user's operation, the portable electronic device is mostly provided with a groove to accommodate the stylus. But in the existent groove design, for the convenience of the user to take out and put back the stylus, the housing of the portable electronic device is mostly formed with a broken surface or a recessed portion so that the user may easily apply a force to the stylus in order to take out the stylus from inside the portable electronic device. Nevertheless, the broken surface or the recessed portion results in an unappealing appearance of the portable electronic device.

SUMMARY OF THE INVENTION

The disclosure provides a retractable pen that is switchable between extending and retracting states, so that the retractable pen may be accommodated in or taken out from a portable electronic device easily.

The retractable pen of the disclosure is adapted for being accommodated in the portable electronic device. The retractable pen includes a housing, a shaft, a cap, a driving member and an elastic member. The shaft is fixed in the housing and has a first ratcheting structure. The cap has a second ratcheting structure movably engaged with the first ratcheting structure. The driving member rotatably sheathes the shaft and is located in the cap. The driving member has a third ratcheting structure. The elastic member sheathes the shaft and leans against between the shaft and the driving member. The elastic member constantly drives the driving member toward the first ratcheting structure or the second ratcheting structure. In a first state, the third ratcheting structure leans against the first ratcheting structure. In a second state, the third ratcheting structure is movably engaged with the second ratcheting structure and leans against the first ratcheting structure so as to push the cap away from the housing.

Based on the foregoing, regarding the retractable pen, owing to the cooperation between the driving member and the elastic member, and depending on whether the first ratcheting structure of the shaft, the second ratcheting structure of the cap and the third ratcheting structure of the driving member lean against one another or not, the cap of the retractable pen may be moved away from the housing so that the retractable pen is switched to the extending state, or the cap may be moved closer to the housing so that the retractable pen is switched to the retracting state. In this way, through the extending and retracting states of the retractable pen, the retractable pen may either be accommodated in the portable electronic device or be easily taken out from the portable electronic device.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 1C and FIG. 1D are schematic views showing the extending and retracting states of the retractable pen.

DESCRIPTION OF THE EMBODIMENTS

Figure 1A:
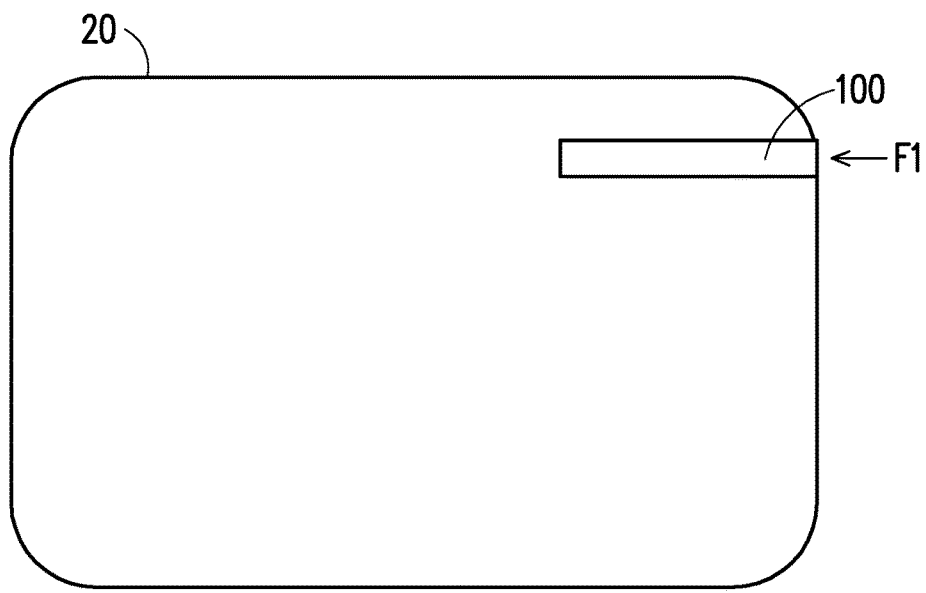
FIG. 1A and FIG. 1B are schematic views of a retractable pen and a portable electronic device according to an embodiment of the disclosure.
Figure 1B:
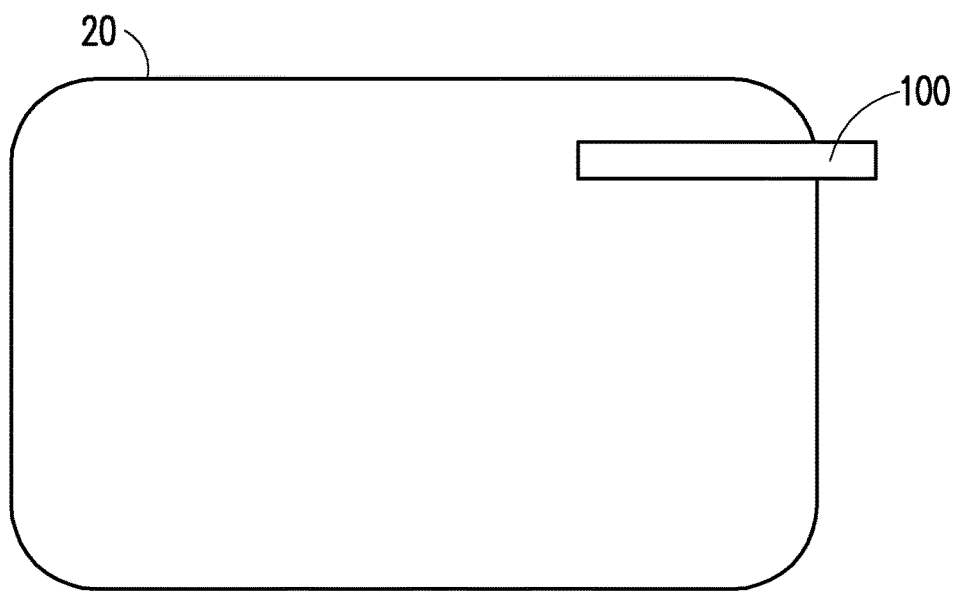

FIG. 1A and FIG. 1B are schematic views of a retractable pen and a portable electronic device according to an embodiment of the disclosure for illustrating extending and retracting states of the retractable pen and the corresponding relationship between the retractable pen and the portable electronic device. FIG. 1C and FIG. 1D are schematic views showing the extending and retracting states of the retractable pen. In this embodiment, a retractable pen 100 is a stylus, for example, and is adapted for being accommodated in a portable electronic device 20 (such as a tablet computer, but is not limited thereto), so that the user may conveniently take out the retractable pen 100 from the portable electronic device 20 and use the retractable pen 100 to operate and control the portable electronic device 20. Once the retractable pen 100 is no longer in use, it may then be accommodated in the portable electronic device 20 to be carried around easily. Herein the retractable pen 100 includes a housing 110, a shaft 120 and a cap 130. As shown in FIG. 1A, the retractable pen 100, when accommodated in the portable electronic device 20, is substantially completely hidden in the body of the portable electronic device 20, so that structurally there is no exposed portion to which the user may apply a force for taking out the retractable pen 100. Therefore, to facilitate the user's taking out and putting back the retractable pen 100, the retractable pen 100 in this embodiment is structurally provided with the cap 130 that may be pressed by a force and be moved as in the state of FIG. 1C, so that the retractable pen 100 may be switched from a first state (retracting state) in FIG. 1C to a second state (extending state) of FIG. 1D. That is, the cap 130 is pushed away from the housing 110 to achieve the desired extending state. If the foregoing process is explicated with reference to FIG. 1A and FIG. 1B, it can be clearly known that the cap 130 of the retractable pen 100 accommodated in the portable electronic device 20 is pressed by the user (that is, provided with a force F1), so that the retractable pen 100 may be switched to the extending state as shown in FIG. 1B, and the user may then conveniently take out the retractable pen 100. After the retractable pen is used and needs to be put back into the portable electronic device 20, the user only needs to press the cap 130 again to switch the retractable pen 100 to the first state, and the retractable pen 100 may then be completely hidden in the portable electronic device 20 again as shown in FIG. 1A.

Figure 2A:
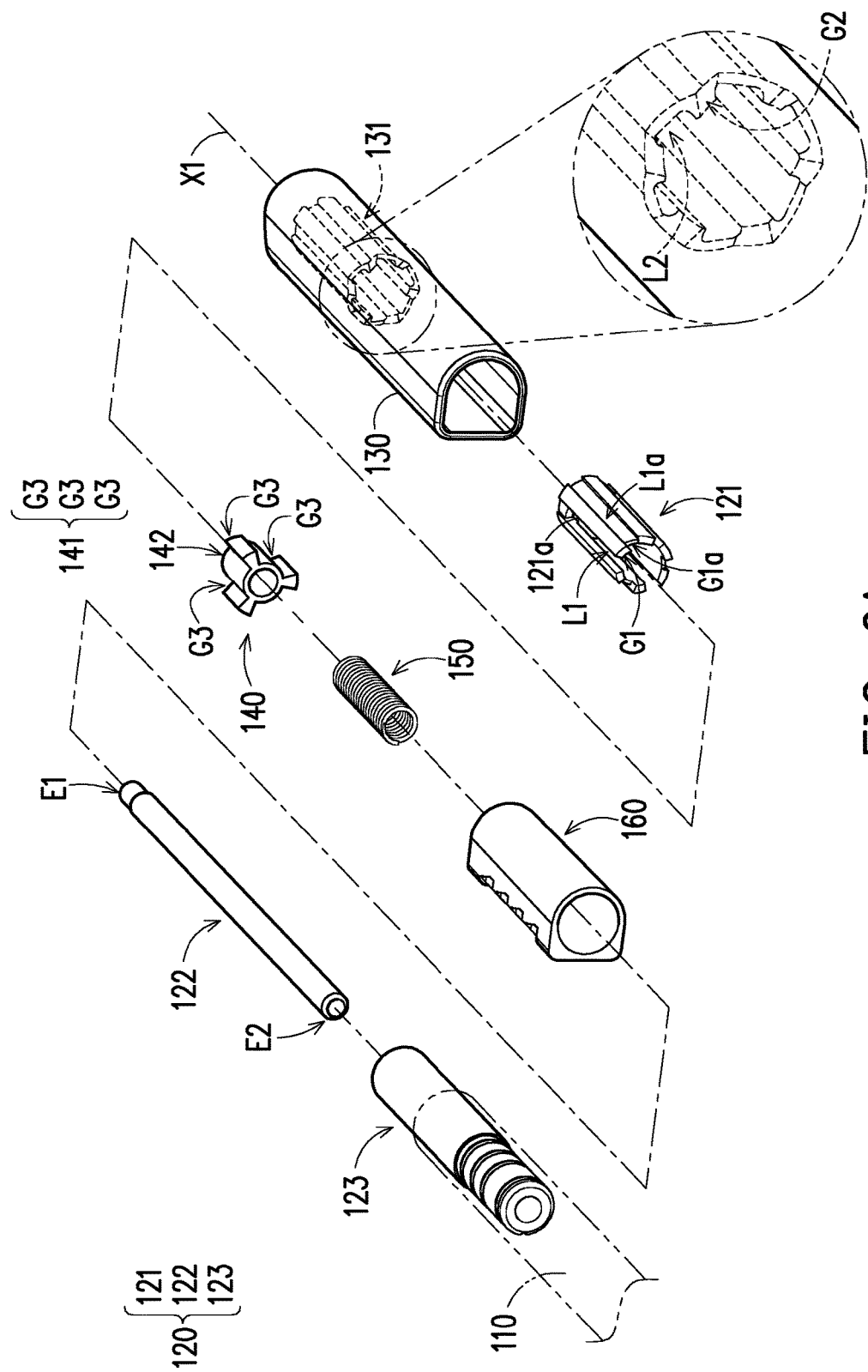
FIG. 2A is an exploded view of some components of the retractable pen.
Figure 2B:
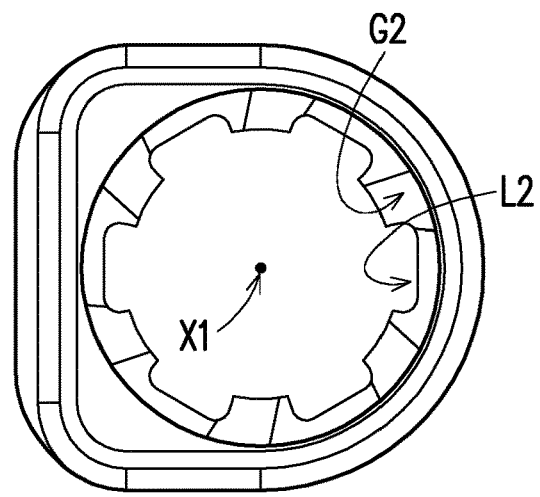
FIG. 2B shows the cap from another perspective.
Figure 2C:
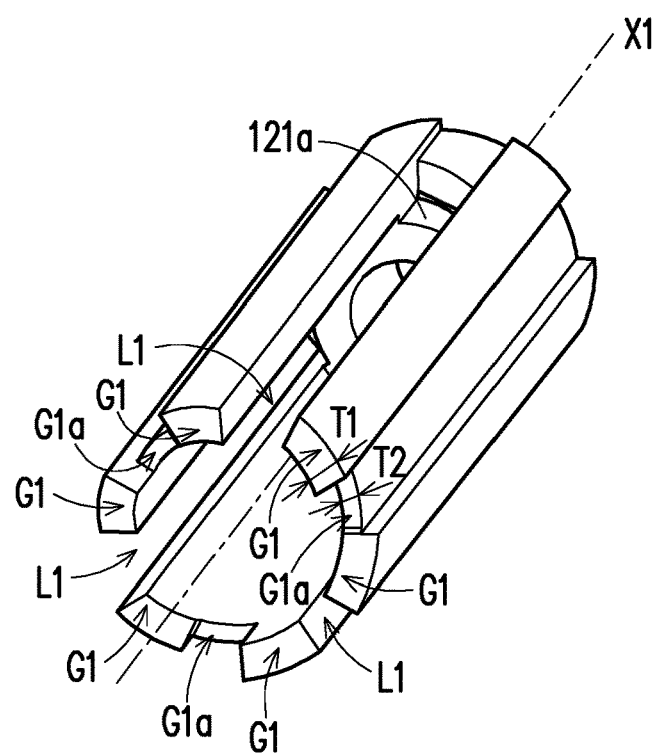
FIG. 2C shows a first ratcheting structure from another perspective.
Figure 3A:
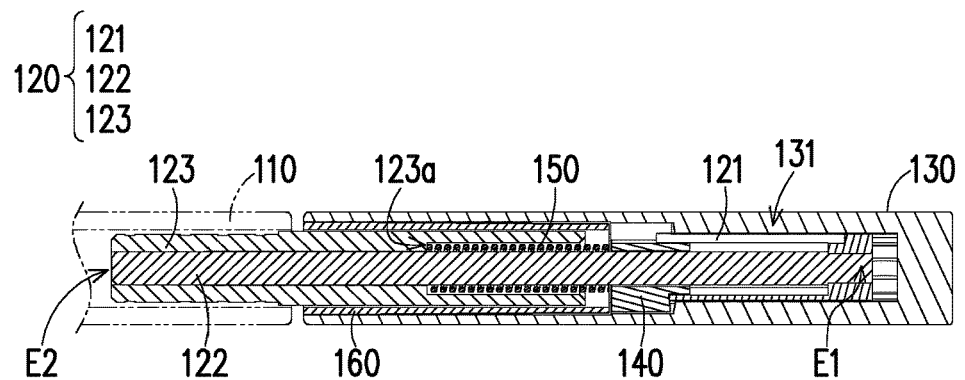
FIG. 3A to FIG. 3C are schematic views showing some components of the retractable pen in the retracting state.
Figure 3B:
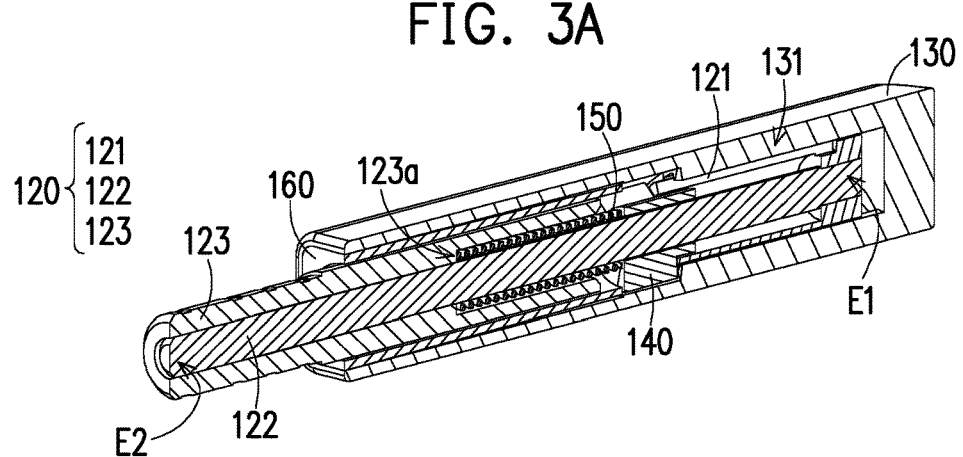
Figure 3C:
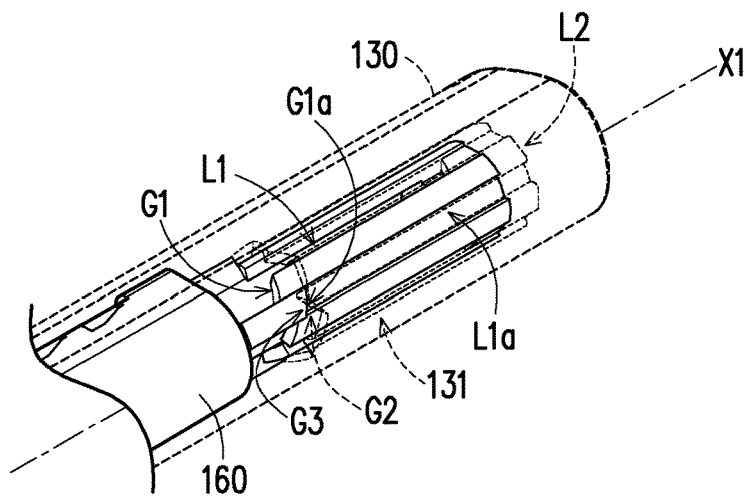

FIG. 2A is an exploded view of some components of the retractable pen. FIG. 2B shows the cap from another perspective. FIG. 2C shows a first ratcheting structure from another perspective. FIG. 3A to FIG. 3C are schematic views showing some components of the retractable pen in the first state. Herein FIG. 3A and FIG. 3B are provided as cross-sectional views to facilitate identifying the state of the internal components. With reference to FIG. 2A to FIG. 2C and FIG. 3A to FIG. 3C, in this embodiment, the retractable pen 100 further includes a driving member 140 and an elastic member 150, and the shaft 120 is fixed in the housing 110 and has a first ratcheting structure 121. The cap 130 has a second ratcheting structure 131 movably engaged with the first ratcheting structure 121. The driving member 140 rotatably sheathes the shaft 120 and is located in the cap 130, and has a third ratcheting structure 141. The elastic member 150 sheathes the shaft 120 and leans against between the shaft 120 and the driving member 140. The elastic member 150 constantly drives the driving member 140 closer to the first ratcheting structure 121 or the second ratcheting structure 131. In the first state, the driving member 140 is driven by the elastic member 150, so that the third ratcheting structure 141 leans against and is blocked by the first ratcheting structure 121. In the second state, the driving member 140 is driven by the elastic member 150, so that the third ratcheting structure 141 is movably engaged with the second ratcheting structure 131 and leans against and is blocked by the first ratcheting structure 121 so as to push the cap 130 away from the housing 110.

To be more specific, the shaft 120 further includes a shaft member 122 and a fixing member 123. The shaft member 122 has a first end E1 and a second end E2 opposite to the first end E1. The first ratcheting structure 121 is disposed at the first end E1. The driving member 140 rotatably sheathes the shaft member 122 to be positioned between the first end E1 and the second end E2. The second end E2 of the shaft member 122 is inserted through the fixing member 123 and is fixed in the housing 110 by the fixing member 123. The elastic member 150 sheathes the shaft member 122 and leans against between the fixing member 123 and the driving member 140. As shown in FIG. 3A and FIG. 3B, the inner wall of the fixing member 123 is formed with a step portion 123a, so that one end of the elastic member 150 is received in the fixing member 123 and leans against the step portion 123a, and the other end of the elastic member 150 leans against the driving member 140. Here, the first ratcheting structure 121, the shaft member 122 and the fixing member 123 of the shaft 120 may be viewed as an integral structure fixed in the housing 110. That is, there is no relative movement between the first ratcheting structure 121, the shaft member 122 and the fixing member 123 and the housing 110.

Moreover, the retractable pen 100 further includes a blocking member 160 fixed on the inner wall of the cap 130 to block and maintain the driving member 140 in the cap 130 so as to prevent the driving member 140 from sliding out of the cap 130 when it is actuated.

Besides, with reference to FIG. 2A and FIG. 2C, the first ratcheting structure 121 in this embodiment has a plurality of first tooth portions G1 and a plurality of auxiliary tooth portions G1a, and the first tooth portions G1 and the auxiliary tooth portions G1a are alternately arranged around an axis X1 of a shaft 122. The auxiliary tooth portion G1a is connected between two adjacent first tooth portions G1 to form an auxiliary groove portion L1a. A first groove portion L1 is formed between two adjacent first tooth portions G1 to which the auxiliary tooth portion G1a is not connected. Therefore, the first groove portion L1 and the auxiliary groove portion L1a are also alternately arranged around the axis X1 at intervals. Here, with the axis X1 used as a reference standard, a radial thickness T1 of the first tooth portion G1 with respect to the axis X1 is greater than a radial thickness T2 of the auxiliary tooth portion G1a with respect to the axis X1, so that the auxiliary groove portion L1a may be formed between the two adjacent first tooth portions G1 connected to the auxiliary tooth portion G1a. In other words, for the first ratcheting structure 121, the first groove portion L1 may be viewed as a through opening, but the auxiliary groove portion L1a may not.

With reference to FIG. 2A and FIG. 2B, the second ratcheting structure 131 in this embodiment has a plurality of second tooth portions G2 and a plurality of second groove portions L2, and the second tooth portions G2 and the second groove portions L2 are arranged around the axis X1. The second tooth portion G2 movably leans against the first groove portion L1 or the auxiliary groove portion L1a along the axis X1. The first tooth portion G1 movably leans against the second groove portion L2 along the axis X1. Accordingly, the cap 130 and the shaft 120 may slide relative to each other along the axis X1. At the same time, the third ratcheting structure 141 in this embodiment is constituted by three third tooth portions G3 (but not limited thereto). Depending on whether the cap 130 is pressed with a force or not, the third tooth portion G3 switchably leans against the first tooth portion G1 and the second tooth portion G2 due to the rotation of the driving member 140 along the axis X1, so that the driving member 140 may drive the cap 130 away from the housing 110 or toward the housing 110.

Figure 4:
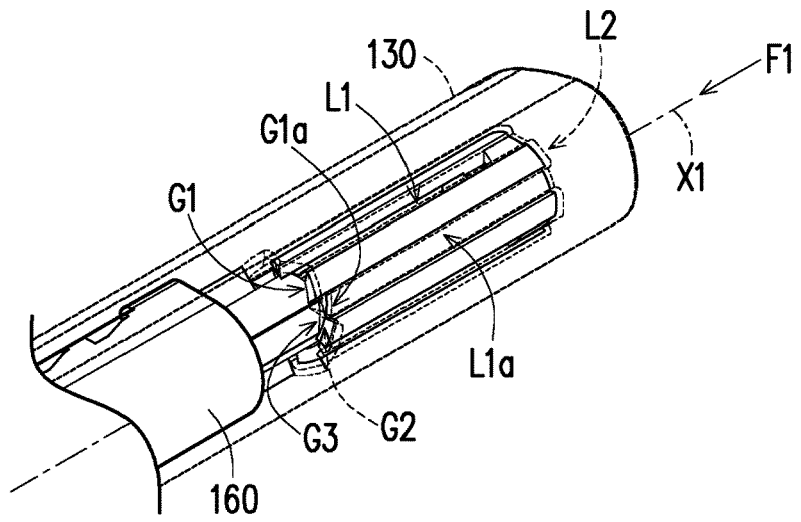
FIG. 4 to FIG. 6 are schematic partial views respectively showing the retractable pen in different states.
Figure 5:
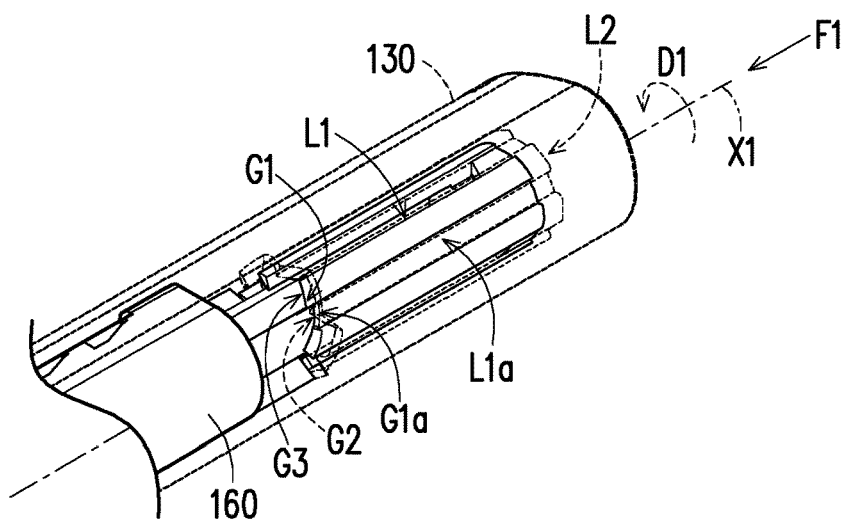
Figure 6:
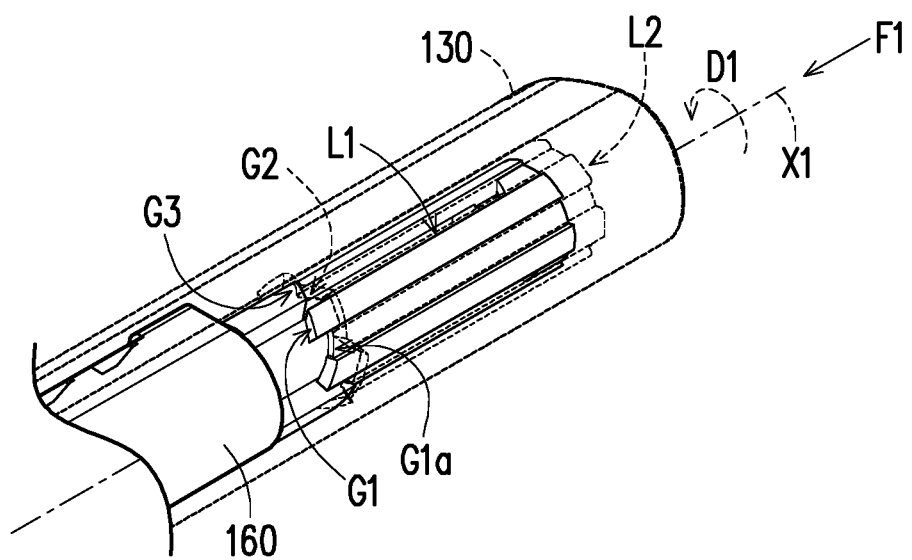
Figure 7A:
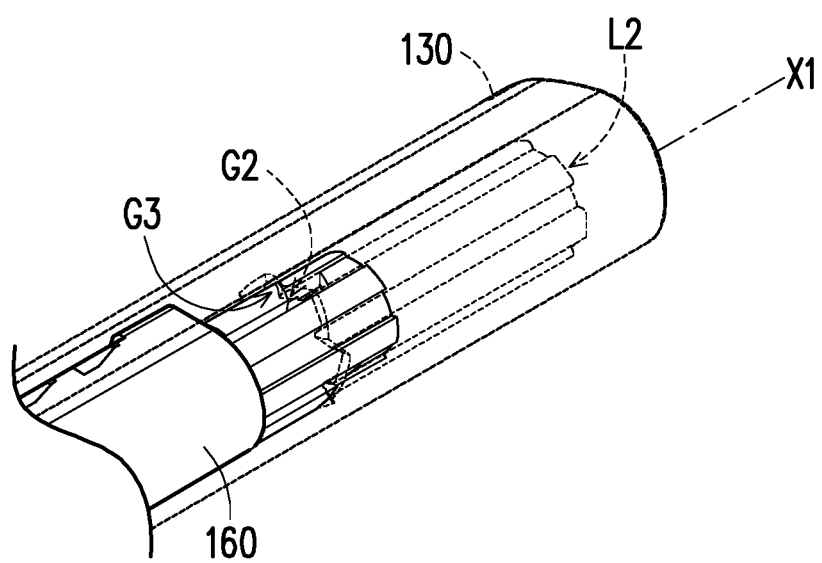
FIG. 7A to FIG. 7C are schematic views showing the retractable pen in the extending state.
Figure 7B:
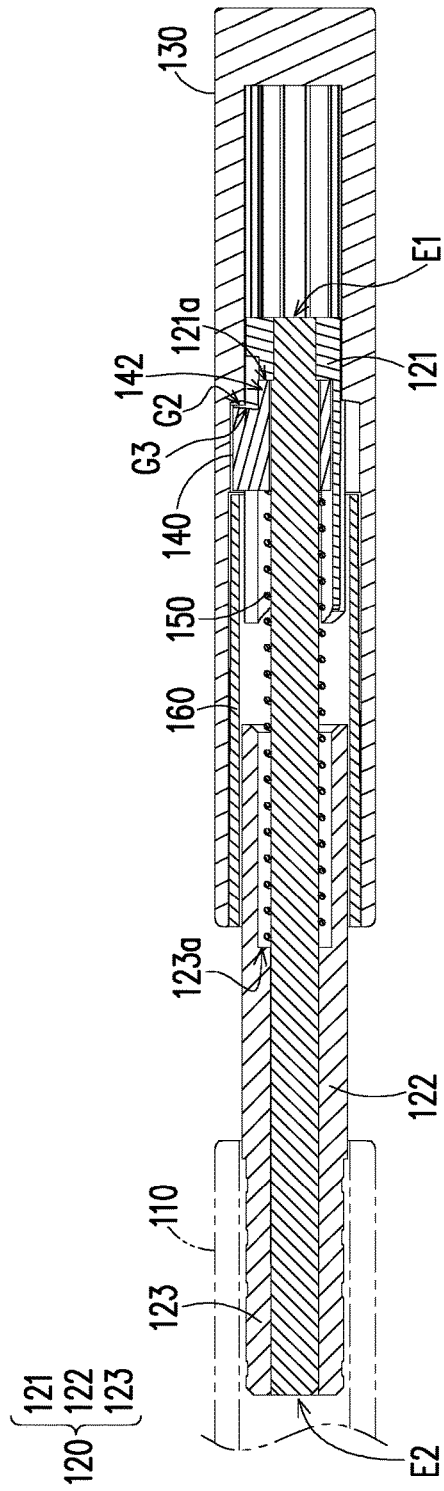
Figure 7C:
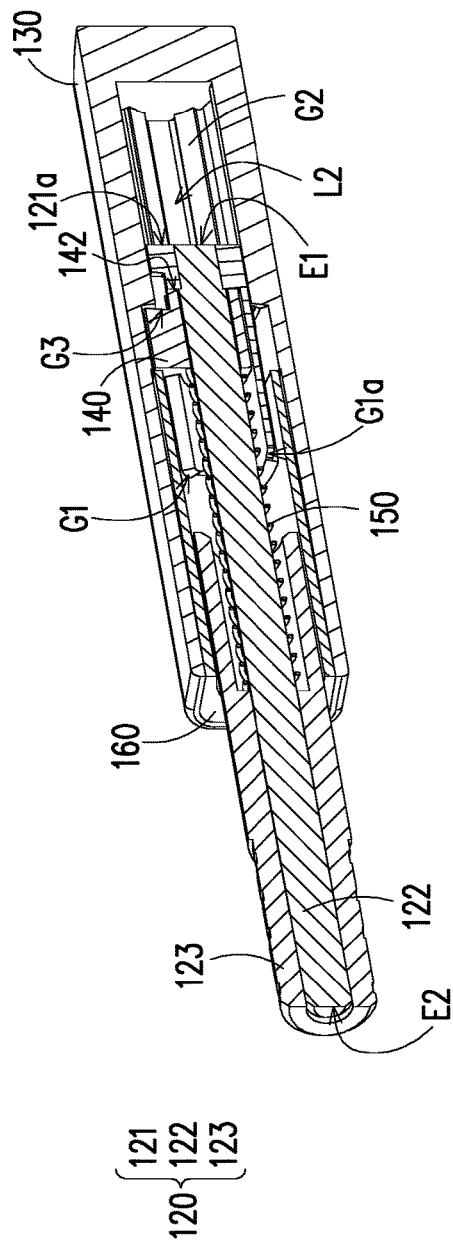

FIG. 4 to FIG. 6 are schematic partial views respectively showing the retractable pen in different states. FIG. 7A to FIG. 7C are schematic views showing the retractable pen in the extending state. Herein FIG. 7B and FIG. 7C are illustrated as partial cross-sectional views to facilitate identifying the relationship among the internal components. First, please refer to FIG. 3A to FIG. 3C and FIG. 4. As shown in FIG. 3A to FIG. 3C (also as shown in FIG. 1A and FIG. 1C), at this time, the retractable pen 100 is adapted for being accommodated in the portable electronic device 20, i.e., in the first state. The driving member 140 is driven by the elastic member 150, so that the third tooth portion G3 leans against and is blocked by the auxiliary tooth portion G1a and the second tooth portion G2.

Therefore, in order to smoothly take out the retractable pen 100, the user must apply the force F1 to the cap 130 first. As shown in FIG. 4 to FIG. 6, when the force F1 is applied to the cap 130, the cap 130 is moved toward the housing 100 first to deform (compress) the elastic member 150. At this time, the second tooth portion G2 leans against the third tooth portion G3 to push the third tooth portion G3 away from the auxiliary tooth portion G1a. That is to say, at this time, the driving member 140 is driven by the cap 130 to be pushed away from the first ratcheting structure 121 of the shaft 120. At the same time, the first tooth portion G1, the second tooth portion G2 and the third tooth portion G3 are all abutting slopes inclined with respect to the axis X1, and these abutting slopes have a uniform inclination tendency and are all substantially oriented toward a direction D1. That is to say, in the direction D1, an axial length of one side of a previous first tooth portion G1 adjacent to a previous auxiliary tooth portion G1a along the axis X1 is greater than an axial length of one side of the previous first tooth portion G1 adjacent to a previous first groove portion L1 along the axis X1, and a length of one side of a next first tooth portion G1 adjacent to the previous first groove portion L1 is greater than a length of one side of the next first tooth portion G1 adjacent to a next auxiliary tooth portion G1a. Therefore, in the state in which the force F1 is continuously applied, the driving member 140 is rotated in the direction D1 and provides a blocking effect, so that the third tooth portion G3 passes through the first tooth portion G1 (as shown in FIG. 6) to rotate to a position aligned with the first groove portion L1. That is, as shown in FIG. 6, the third tooth portion G3 at this time is also regarded as being blocked by the next first tooth portion G1. Here, FIG. 4 to FIG. 6 are defined as a third state in which the driving member undergoes the switching process.

Then, with reference to FIG. 7A to FIG. 7C, when the third tooth portion G3 of the driving member 140 is aligned with the first groove portion L1 and when the force F1 is released, the elastic member 150 then drives the driving member 140 to move into the first groove portion L1 along the axis X1. As described above, the second ratcheting structure 131 of the cap 130 and the first ratcheting structure 121 of the shaft 120 are slidably engaged with each other. Therefore, when the third tooth portion G3 of the driving member 140 is moved in the first groove portion L1 of the first ratcheting structure 121, the third tooth portion G3 leans against the second tooth portion G2 of the second ratcheting structure 131 of the cap 130. That is, the third tooth portion G3 and the second tooth portion G2 are both moved in the first groove portion L1. In this way, when the shaft 120 and the housing 110 are fixed to each other, the driving member 140 may then be driven by the elastic member 150 to push the cap 130 away from the housing 110. The retractable pen 100 is thereby switched to the second state (extending state), and as shown in FIG. 1B and FIG. 1D, the user may then take out the retractable pen 100 from the portable electronic device 20 by gripping the cap 130.

With reference to FIG. 2C, FIG. 7B and FIG. 7C again, in this embodiment, the first ratcheting structure 121 of the shaft 120 also has a blocking portion 121a positioned at one end of the first groove portion L1 away from one end of the housing 110. In the second state, the third tooth portion G3 leans against the second tooth portion G2 to push the cap 130 away from the housing 110 until an abutting portion 142 of the driving member 140 leans against the blocking portion 121a, thereby completing the action of moving the cap 130 away from the housing 110.

On the other hand, when the retractable pen 100 is to be restored to the first state (that is, when the retractable pen 100 is to be accommodated back into the portable electronic device 20), the user at this time only needs to apply the force F1 to the cap 130 again, so that the driving member 140 is rotated in the direction D1 again as shown in the foregoing process of FIG. 4 to FIG. 6, and the third tooth portion is switched and leans against the second tooth portion G2 and the auxiliary tooth portion G1a. However, at this time, the third tooth portion G3 is moved from the first groove portion L1 to the next auxiliary groove portion L1a, so that the retractable pen 100 may be restored to the first state as shown in FIG. 3A to FIG. 3C.

To summarize, in the retractable pen of the embodiment of the disclosure, owing to the cooperation between the driving member and the elastic member, and depending on whether the first ratcheting structure of the shaft, the second ratcheting structure of the cap and the third ratcheting structure of the driving member lean against one another or not, the cap of the retractable pen may be moved away from the housing so that the retractable pen is switched to the extending state, or the cap may be moved toward the housing so that the retractable pen is switched to the retracting state. In this way, through the extending and retracting states of the retractable pen, the retractable pen may either be accommodated in the portable electronic device or be easily taken out from the portable electronic device.

Although the embodiments are already disclosed as above, these embodiments should not be construed as limitations on the scope of the disclosure. It will be apparent to those skilled in the art that various modifications and variations can be made to the disclosed embodiments without departing from the scope or spirit of this disclosure. In view of the foregoing, it is intended that the disclosure covers modifications and variations provided that they fall within the scope of the following claims and their equivalents.

What is claimed is:

1. A retractable pen adapted for being accommodated in a portable electronic device, the retractable pen comprising:
   a housing;
   a shaft fixed in the housing and having a first ratcheting structure;
   a cap having a second ratcheting structure movably engaged with the first ratcheting structure;
   a driving member rotatably sheathing the shaft and located in the cap, the driving member having a third ratcheting structure; and
   an elastic member sheathing the shaft and leaning against the shaft and the driving member, wherein the elastic member constantly drives the driving member toward the first ratcheting structure or the second ratcheting structure; in a first state, the driving member is driven by the elastic member so that the third ratcheting structure leans against and is blocked by the first ratcheting structure; and in a second state, the driving member is driven by the elastic member so that the third ratcheting structure is movably engaged with the second ratcheting structure and leans against and is blocked by the first ratcheting structure so as to push the cap away from the housing.

2. The retractable pen as recited in claim 1, wherein the shaft comprises:
   a shaft member having a first end and a second end opposite to the first end, wherein the first ratcheting structure is disposed at the first end, and the driving member rotatably sheathes the shaft member; and
   a fixing member, wherein the second end of the shaft member is inserted through the fixing member, and is fixed in the housing by the fixing member, and the elastic member sheathes the shaft member and leans against between the fixing member and the driving member.

3. The retractable pen as recited in claim 1, further comprising:
a blocking member fixed on the cap to block the driving member in the cap.

4. The retractable pen as recited in claim 1, wherein the first ratcheting structure has a plurality of first tooth portions and a plurality of auxiliary tooth portions, and the plurality of first tooth portions and the plurality of auxiliary tooth portions are arranged around an axis of the shaft, wherein the auxiliary tooth portion is connected between adjacent two of the plurality of first tooth portions to form an auxiliary groove portion, a first groove portion is formed between adjacent two of the plurality of first tooth portions to which the auxiliary tooth portion is not connected, and the first groove portion and the auxiliary groove portion are arranged around the axis at intervals.

5. The retractable pen as recited in claim 4, wherein the second ratcheting structure has a plurality of second tooth portions and a plurality of second groove portions, and the plurality of second tooth portions and the plurality of second groove portions are arranged around the axis, wherein the second tooth portion movably leans against the first groove portion or the auxiliary groove portion along the axis, and the first tooth portion movably leans against the second groove portion along the axis.

6. The retractable pen as recited in claim 5, wherein the third ratcheting structure has a plurality of third tooth portions; in the first state, the third tooth portion leans against the auxiliary tooth portion and the second tooth portion; and in the second state, the third tooth portion leans against the second tooth portion, and the third tooth portion and the second tooth portion are both located in the first groove portion.

7. The retractable pen as recited in claim 6, wherein the first tooth portion, the auxiliary tooth portion, the second tooth portion and the third tooth portion are all abutting slopes inclined with respect to the axis.

8. The retractable pen as recited in claim 6, wherein the first ratcheting structure further has a blocking portion positioned at one end of the first groove portion away from the housing; and in the second state, the third tooth portion leans against the second tooth portion, and the driving member leans against the blocking portion.

9. The retractable pen as recited in claim 4, wherein an axial length of one side of the first tooth portion adjacent to the auxiliary tooth portion along the axis is greater than an axial length of one side of the first tooth portion adjacent to the first groove portion along the axis.

10. The retractable pen as recited in claim 6, wherein the cap is adapted to be applied with a force so as to switch from the first state or the second state to a third state; and in the third state, due to the force, the cap moves the driving member away from the first ratcheting structure, rotates the driving member along the axis, and deforms the elastic member by the second ratcheting structure abutting and pushing the third ratcheting structure of the driving member.

11. The retractable pen as recited in claim 10, wherein when the force is released, the driving member that has been rotated is switched to the first state by the third tooth portion leaning against the auxiliary tooth portion and against the second tooth portion, or the driving member that has been rotated is switched to the second state by the third tooth portion leaning against the second tooth portion and moving into the first groove portion.

12. The retractable pen as recited in claim 4, wherein a radial thickness of the first tooth portion with respect to the axis is greater than a radial thickness of the auxiliary tooth portion with respect to the axis.

* * * * *